(12) United States Patent
Daviduk et al.

(10) Patent No.: US 11,072,105 B2
(45) Date of Patent: Jul. 27, 2021

(54) METHOD AND APPARATUS FOR EXTRUDING BLOWN FILM WITH A CONTROLLED THICKNESS PROFILE

(71) Applicant: Layfield Group Ltd., Richmond (CA)

(72) Inventors: Harvey A. Daviduk, Surrey (CA); David G. Brandle, Richmond (CA)

(73) Assignee: LAYFIELD GROUP LTD., Richmond (CA)

( * ) Notice: Subject to any disclaimer, the term of this patent is extended or adjusted under 35 U.S.C. 154(b) by 170 days.

(21) Appl. No.: 16/046,504

(22) Filed: Jul. 26, 2018

(65) Prior Publication Data

US 2019/0030777 A1    Jan. 31, 2019

(30) Foreign Application Priority Data

Jul. 27, 2017    (CA) ................................ CA 2974587

(51) Int. Cl.
*B29C 48/88*    (2019.01)
*B29C 55/28*    (2006.01)
(Continued)

(52) U.S. Cl.
CPC ........ *B29C 48/913* (2019.02); *B29C 48/0018* (2019.02); *B29C 48/10* (2019.02);
(Continued)

(58) Field of Classification Search
CPC ... B29C 48/913; B29C 48/10; B29C 48/0018; B29C 55/28; B29C 2948/92152;
(Continued)

(56) References Cited

U.S. PATENT DOCUMENTS 4,315,963 A * 2/1982 Havens ................... B29C 48/10
428/35.2
4,464,318 A    8/1984 Upmeier et al.
(Continued)

FOREIGN PATENT DOCUMENTS

DE    2658518 A1 *  6/1978 ......... B29C 48/9125
DE    40 13 610 A1    5/1991

OTHER PUBLICATIONS

English translation of DE-2658518-A1, by EPO (Year: 1978).*

*Primary Examiner* — Leith S Shafi
*Assistant Examiner* — Inja Song
(74) *Attorney, Agent, or Firm* — Christensen O'Connor Johnson Kindness, PLLC

(57) ABSTRACT

A method of producing a blown film with a controlled thickness profile, comprises the steps of: extruding molten plastic through an annular extrusion die; cooling the molten plastic using an annular blower around the extrusion die, positioning one or more sources of supplemental air at one or more desired circumferential positions about the annular extrusion die and adjacent to the extruded molten plastic, the annular blower and the one or more sources of supplemental air being operated to supply cooling air to the molten plastic between the annular extrusion die and the frost line where the molten plastic solidifies; and controlling the one or more sources of supplemental air to form one or more areas of increased thickness along a circumferential thickness profile of the blown film, the one or more areas of increased thickness having a thickness that is greater than an average thickness of the circumferential profile.

3 Claims, 4 Drawing Sheets

(51) Int. Cl.
*B29C 48/00* (2019.01)
*B29C 48/10* (2019.01)

(52) U.S. Cl.
CPC ........ *B29C 55/28* (2013.01); *B29C 2948/926* (2019.02); *B29C 2948/92152* (2019.02); *B29C 2948/92647* (2019.02)

(58) Field of Classification Search
CPC .... B29C 2948/926; B29C 2948/92647; B29C 48/03; B29C 55/00; B29C 61/28; B29C 49/04
See application file for complete search history.

(56) References Cited

U.S. PATENT DOCUMENTS

| | | | |
|---|---|---|---|
| 5,281,375 A * | 1/1994 | Konermann | B29C 48/92 264/40.3 |
| 5,288,219 A | 2/1994 | Smith | |
| 5,676,893 A | 10/1997 | Cree | |
| 6,783,344 B1 | 8/2004 | Rudolf | |
| 2002/0130431 A1* | 9/2002 | Randolph | B29C 48/9125 264/40.1 |
| 2008/0061460 A1* | 3/2008 | Zimmermann | B29C 48/92 264/40.1 |
| 2008/0258325 A1* | 10/2008 | Zimmermann | B29C 48/9125 264/40.6 |

\* cited by examiner

METHOD AND APPARATUS FOR EXTRUDING BLOWN FILM WITH A CONTROLLED THICKNESS PROFILE

TECHNICAL FIELD

This relates to a method and apparatus for extruding blown film with a controlled thickness profile.

BACKGROUND

Blown film is often produced using an apparatus as shown in FIG. 4. The apparatus includes a source of molten plastic 102, an extrusion die 104 through which the plastic is extruded, and an annular blower 106 that supplies a consistent supply of cooling air to the molten plastic that has extruded out through extrusion die 104. The molten plastic travels along a film travel path 107, solidifies at a frost line, and is collected by a film collector 108 at the end of film travel path 107. There is also typically an air supply (not shown) within the bubble of plastic that is used to maintain the diameter of the film by controlling the air pressure within the film. While some cooling may be applied within the plastic film, the primary source will be applied using an annular blower 106. While FIG. 1 shows a typical arrangement for producing and collecting a blown film, variations may be used, as is known in the art.

In order to control the thickness of the blown film, various control techniques may be used, an example of which is described in U.S. Pat. No. 5,676,893 (Cree) entitled "Cooling and thickness control for extruded products". The goal of this control is to produce a film that has a consistent thickness.

SUMMARY

According to an aspect, there is provided a method of producing a blown film with a controlled thickness profile, comprising the steps of: extruding molten plastic through an annular extrusion die; cooling the molten plastic using an annular blower that supplies a consistent supply of air around a circumference of the extrusion die, the molten plastic solidifying at a frost line axially spaced from the extrusion die; positioning one or more sources of supplemental air at one or more desired circumferential positions about the annular extrusion die and adjacent to the extruded molten plastic, the annular blower and the one or more sources of supplemental air being operated to supply cooling air to the molten plastic between the annular extrusion die and the frost line; and controlling the one or more sources of supplemental air to form areas of increased thickness along a circumferential thickness profile of the blown film, the areas of increased thickness having a thickness that is greater than an average thickness of the circumferential profile.

According to other aspects, the method may include one or more of the following features, along or in combination: the annular blower and the one or more sources of supplemental air supply cooling air to the molten plastic, and the areas of increased thickness correspond to the position of the one or more sources of supplemental air; the blown film comprises a stretch hooder for packaging objects having a rectangular cross-section, and wherein the blowers are positioned at locations corresponding to the corners of the object; and the one or more sources of supplemental air are positioned between the annular blower and the frost line.

According to an aspect, there is provided an apparatus for producing a blown film with a controlled thickness profile. The apparatus comprises an annular extrusion die, a source of molten plastic connected to supply molten plastic to the extrusion die, a film travel path that extends from the extrusion die to a film collector where the molten plastic travels along the film travel path and cooling to a solid at a frost line, and an annular blower that supplies a consistent supply of air around a circumference of the film travel path. The apparatus also includes one or more sources of supplemental air positioned at one or more desired circumferential positions about the annular extrusion die and adjacent to the extruded molten plastic, the annular blower and the one or more sources of supplemental air being positioned to supply air to the film travel path below the frost line.

According to other aspects, the apparatus may include one or more of the following features, alone or in combination. The blown film comprises a stretch hooder for packaging objects having a rectangular cross-section, and the blowers are positioned at locations corresponding to the corners of the object. The annular blower is positioned adjacent to the extrusion die and the one or more sources of supplemental air are positioned between the annular blower and the frost line.

In other aspects, the features described above may be combined together in any reasonable combination as will be recognized by those skilled in the art.

BRIEF DESCRIPTION OF THE DRAWINGS

These and other features will become more apparent from the following description in which reference is made to the appended drawings, the drawings are for the purpose of illustration only and are not intended to be in any way limiting, wherein.

DETAILED DESCRIPTION

An apparatus for extruding blown film with a controlled thickness profile will now be described with reference to FIG. 1 through 6.

Figure 4:
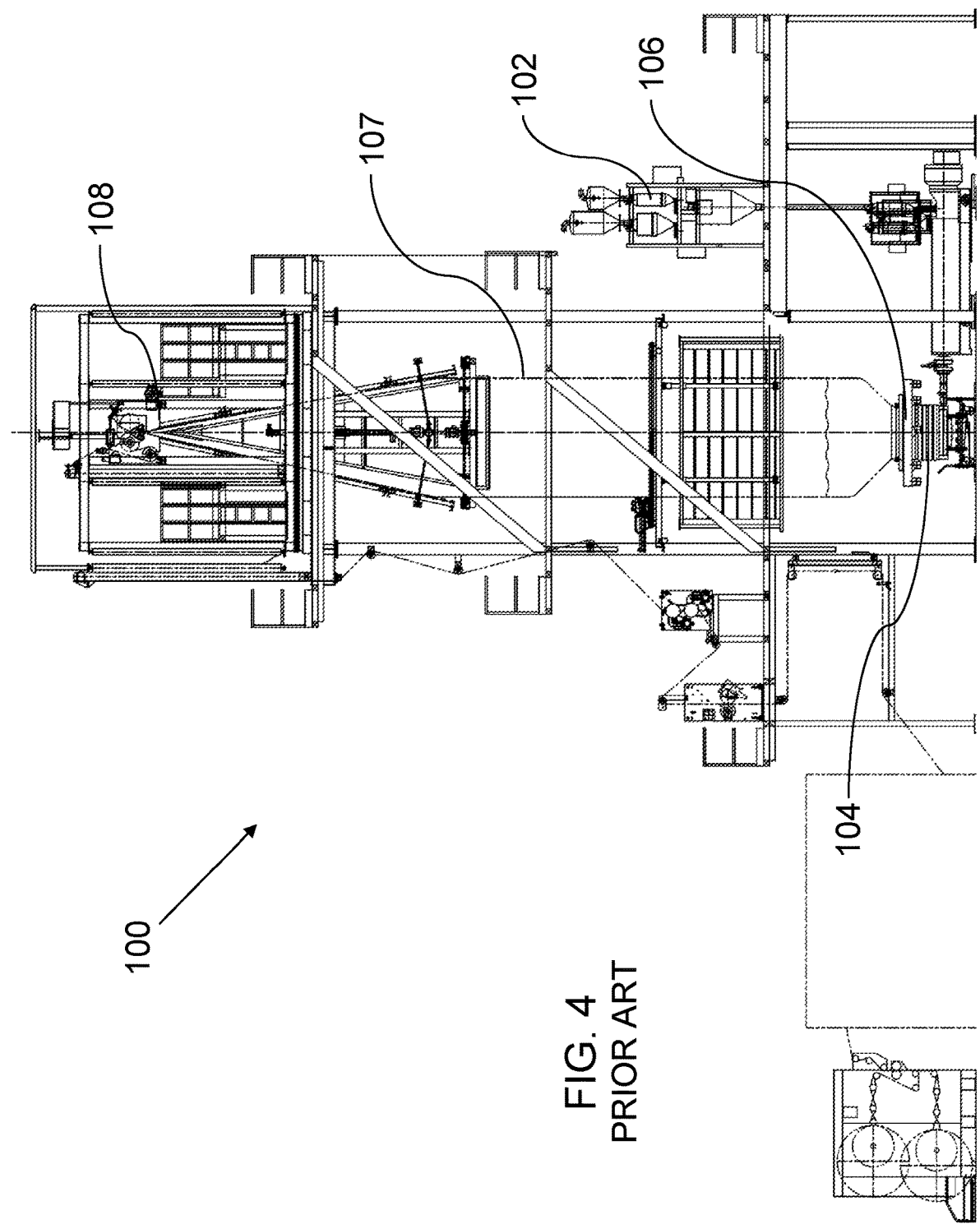
FIG. 4 is a side elevation view of a prior art apparatus that extrudes a plastic film, into which the extruder of FIG. 1 may be incorporated.

A general apparatus 100 for extruding blown film is shown in FIG. 4. Apparatus 100 includes an extrusion die 104 that is supplied by a source of molten plastic 102, an annular blower 106 for cooling the molten plastic, and a film collector 108 that collects the extruded, solidified film. Typically, the film is folded to reduce its cross-section, and then rolled onto a roll of film.

The presently described apparatus and method was initially conceived for use in applications that use stretch hooder film, such as may be used to cover a pallet. By controlling the thickness of the film, it is possible to produce a film with a greater thickness at locations at which additional strength or reinforcement would be beneficial, such as at corners where tearing is more likely to occur. For example, if the film is to be used as stretch hooder for a rectangular pallet, the film may be thickened at four locations along the circumference of the film, corresponding to the corners of the pallet. The number of areas of increased thickness and their location can be selected according to the intended use, and may only require one area of increased thickness, such as to thicken a handle or other point load. There may also be other uses other than as stretch hooder film that may benefit from areas of greater thickness around the circumference of the film, or along the width of the film, including uses that may require the film to be cut and/or opened.

Figure 1:
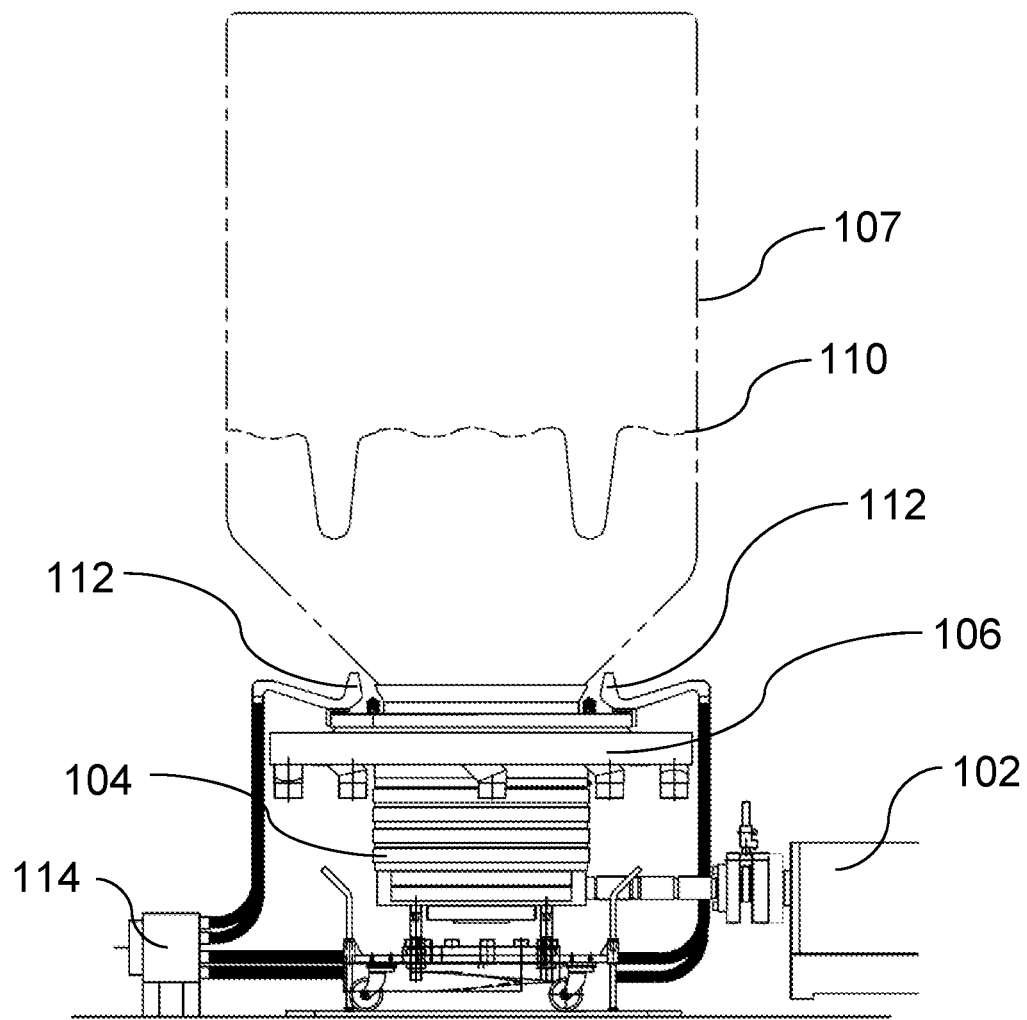
FIG. 1 is a side elevation view of an extruder designed to control the thickness of the plastic film.
Figure 5:
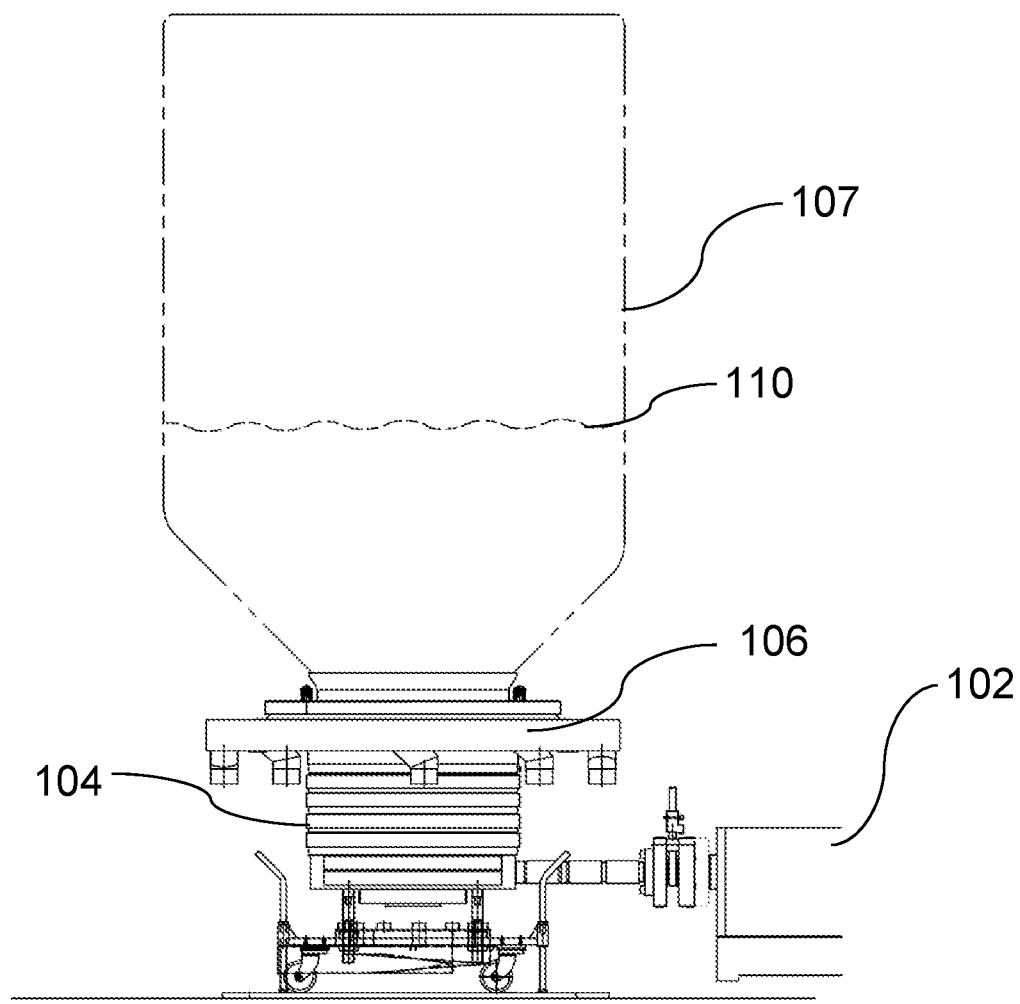
FIG. 5 is an example of a prior art extruder.
Figure 6:
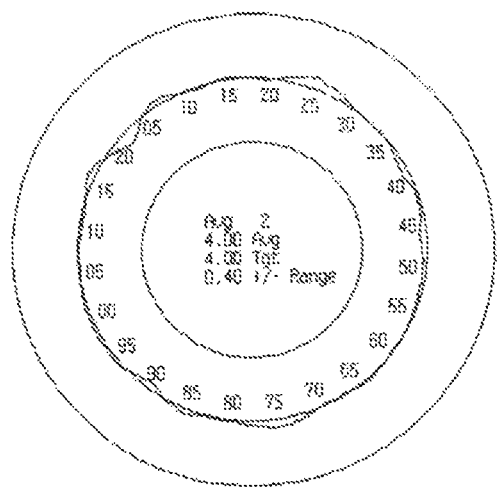
FIG. 6 is a chart depicting the thickness of a film produced from the extruder of FIG. 5.

Referring to FIG. 1, annular blower 106 provides a consistent supply of air around a circumference of extrusion die 104 that is used to cool and solidify the molten plastic that is extruded through die 104 as it travels along film path 107. It will be understood that the extrusion die and annular blower 106 may take various forms, including some designs that correct the air flow through annular blower 106, or molten plastic flow through extrusion die 104, to produce a film with a consistent thickness. As a result of the cooling air, the extruded molten plastic will solidify at a frost line 110. Referring to FIG. 5, in a prior art system, frost line 110 is typically linear, or approximately linear, as the film will cool and solidify at approximately the same height above die 104. This results in a film with a relatively constant thickness, as shown in FIG. 6. Many prior art systems are designed to monitor this type of chart, which can be done in real time, and correct the process to maintain the thickness within acceptable tolerances.

Referring again to FIG. 2, the present apparatus includes one or more sources of supplemental air 112, such as four discrete air nozzles as shown, positioned at desired circumferential positions about annular extrusion die 104 and adjacent to molten plastic extruded therethrough. Annular blower 106 and sources of supplemental air 112 operate together to supply cooling air to the molten plastic as it travels between annular extrusion die 104 and frost line 110, and possibly beyond to further cool the film, if necessary. Annular blower 106 and sources of supplemental air 112 are shown as being supplied by the same source of pressurized air or fan 114, although separate sources of air may be provided, as is known in the art. As shown, annular blower 106 is outside and slightly below annular extrusion die 104, while sources of supplemental air 112 are above annular blower 106, but below frost line 110. It will be understood that different configurations and designs may be used. For example, rather than sources of supplemental air 112 made up of individual nozzles that are movable as shown, there may be other designs, such as a single annular blower 106 with portions blocked to create discrete streams of cooling air. By providing cooling air at specific locations, it has been found that the thickness of the film can be increased in those locations. Furthermore, it may also be possible to control the thickness of the areas of increased thickness by controlling the amount of airflow through sources of supplemental air 112, and therefore the rate of cooling. Typically, the volume of supplemental air will be a fraction of the volume of air through annular blower 106, although the actual amount will depend on the desired results and the equipment design. The width of the area of thickness may be controlled at least in part by the width of supplemental air source 112. For example, in one trial, round nozzles that were about 2 or 3 inches across was able to increase the thickness across a width of about 6 to 8 inches. It may also be possible to control the profile of the thickened area by controlling the shape of the nozzles. In addition, control of the thickness may be enhanced using any control that may be provided with respect to those previously used with annular blower 106, if desired.

Figure 2:
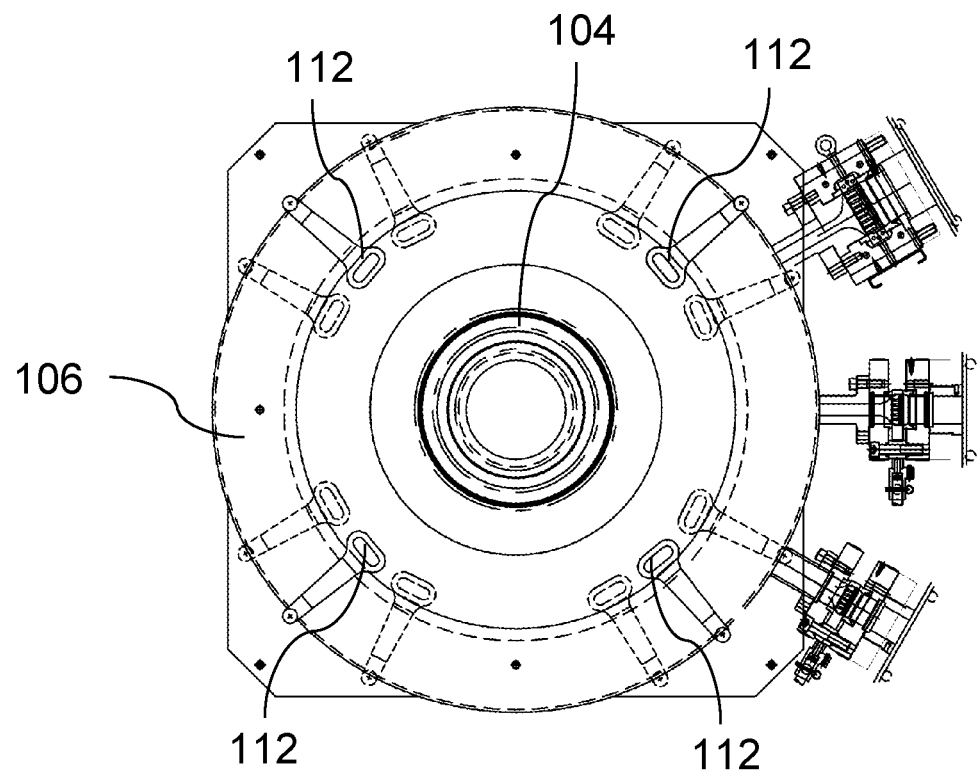
FIG. 2 is a top plan view of the extruder of FIG. 1.
Figure 3:
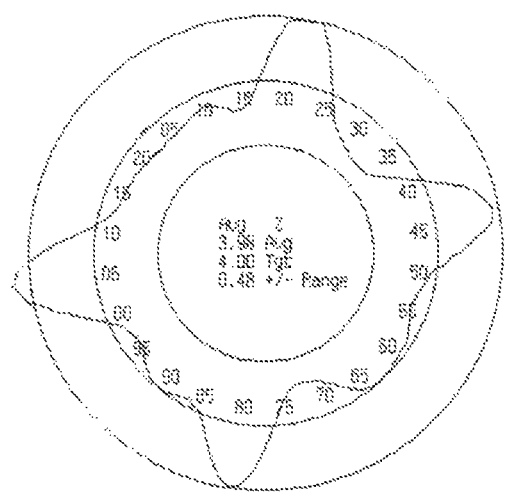
FIG. 3 is graph of a thickness profile of a film with a controlled thickness.

An example of a thickness measurement is shown in FIG. 3, where the increase in thickness can be seen. In addition, referring to FIG. 1, it can be seen that frost line 110 is less linear, with frost line 110 being noticeably lower in locations corresponding to sources of supplemental air 112. These areas correspond to a thicker film that has a thickness greater than the average thickness of the film. Referring to FIG. 2, it can be seen that sources of supplemental air 112 may be repositioned, depending on the preferred dimensions. Alternatively, if sources of supplemental air 112 are provided by a single ring with flow restrictions (not shown), the areas of increased thickness may be provided by moving the restrictions and therefore controlling the flow of supplemental air.

In this patent document, the word "comprising" is used in its non-limiting sense to mean that items following the word are included, but items not specifically mentioned are not excluded. A reference to an element by the indefinite article "a" does not exclude the possibility that more than one of the elements is present, unless the context clearly requires that there be one and only one of the elements.

The scope of the following claims should not be limited by the preferred embodiments set forth in the examples above and in the drawings, but should be given the broadest interpretation consistent with the description as a whole.

What is claimed is:

1. A method of producing a blown film with a controlled thickness profile, comprising the steps of:
   extruding molten plastic through an annular extrusion die;
   cooling the molten plastic using an annular blower that supplies a consistent supply of air around a circumference of the extrusion die, the molten plastic solidifying at a frost line axially spaced from the extrusion die;
   positioning one or more sources of supplemental air at one or more discrete circumferential positions about the annular extrusion die between the annular blower and the frost line and adjacent to the extruded molten plastic, the annular blower and the one or more sources of supplemental air being operated to supply cooling air to the molten plastic between the annular extrusion die and the frost line; and
   controlling, at least by physically repositioning, the one or more sources of supplemental air to form one or more areas of increased thickness along a circumferential thickness profile of the blown film, the one or more areas of increased thickness having a thickness that is greater than an average thickness of the circumferential thickness profile;
   wherein each area of increased thickness corresponds to the position of a corresponding one of the one or more sources of supplemental air.

2. The method of claim 1, wherein the blown film comprises a stretch hooder for packaging objects having a rectangular cross-section, and wherein each of the one or more sources of supplemental air comprise a plurality of discrete nozzles positioned at locations corresponding to corners of the objects.

3. The method of claim 2, further comprising the step of physically repositioning the plurality of discrete nozzles.

* * * * *